United States Patent [19]

Fuchs

[11] 4,090,965
[45] May 23, 1978

[54] INSTALLATION FOR THE MECHANICAL-BIOLOGICAL PURIFICATION OF WASTE WATER

[75] Inventor: Ernst Fuchs, Schmerikon, Switzerland

[73] Assignee: Mecafina SA, Schmerikon, Switzerland

[21] Appl. No.: 318,541

[22] Filed: Dec. 26, 1972

[30] Foreign Application Priority Data

Dec. 29, 1971 Switzerland ............... 19130/71

[51] Int. Cl.² .................. C02B 1/04; B01D 33/06
[52] U.S. Cl. .................... 210/151; 210/297; 210/356; 210/391; 210/402
[58] Field of Search ............ 210/150, 151, 152, 297, 210/402, 509, 356, 331, 393, 6, 17, 197, 404, 415, 386, 391

[56] References Cited

U.S. PATENT DOCUMENTS

| | | | |
|---|---|---|---|
| 3,074,560 | 1/1963 | Kinney | 210/393 X |
| 3,347,379 | 10/1967 | Miller | 210/402 |
| 3,400,822 | 9/1968 | McKeown | 210/197 |
| 3,472,002 | 10/1969 | Brown et al. | 210/393 |
| 3,619,420 | 8/1969 | Kemmer | 210/6 |
| 3,703,462 | 11/1972 | Smith | 210/150 |
| 3,744,634 | 7/1973 | Schlenz | 210/151 |

FOREIGN PATENT DOCUMENTS

| | | | |
|---|---|---|---|
| 1,026,729 | 3/1958 | Germany | 210/150 |
| 1,952,944 | 5/1970 | Germany | 210/17 |
| 1,459,482 | 6/1971 | Germany | 210/150 |
| 260,619 | 5/1970 | U.S.S.R. | 210/331 |

Primary Examiner—Frank A. Spear, Jr.
Assistant Examiner—Ferris H. Lander
Attorney, Agent, or Firm—Werner W. Kleeman

[57] ABSTRACT

An installation for the mechanical-biological purification of waste water or sewage incorporating at least one biological stage and one post-clarification stage, the post-clarification stage incorporating a filter. The filter is a drum filter having a filter surface wherein at the inflow or deposit side thereof there engages a suction nozzle which extends transversely with respect to the direction of relative movement between the filter surface and the suction nozzle.

26 Claims, 15 Drawing Figures

INSTALLATION FOR THE MECHANICAL-BIOLOGICAL PURIFICATION OF WASTE WATER

BACKGROUND OF THE INVENTION

The present invention relates to a new and improved construction of installation for the mechanical-biological purification of waste water or sewage incorporating at least one biological stage and one post-clarification stage, and wherein the post-clarification stage incorporates a filter.

There are known to the art an entire spate of installations for the mechanical-biological purification of waste water or sewage, which, however, in consideration of the ever increasing requirements concerning the purification capacity or output are associated with certain drawbacks.

With known installations, the biological stages of which incorporate immersion drip bodies or drip or trickle bodies, the waste water is initially mechanically pre-clarified in a preclarification stage and then enters the biological stage. In the case of installations operating with immersion drip bodies the micro-organisms appear in the form of a biological mat upon the rotating immersion drip bodies. The micro-organisms acquire the oxygen necessary for decomposition of the sludge material due to rotation of the immersion drip body which ensures a continuous emersion and immersion of the micro-organisms into the water. In a post-clarification stage which follows the biological stage the biologically purified waste water or sewage is separated from the entrained floating particles which, in the first instance, consist of the biological mat, the so-called activated sludge, which has dropped-off the immersion drip body. Separation occurs by settling of the floating particles. Installations incorporating drip bodies function in an analogous manner, with the exception that the biological mat is formed in a loose pile at the bodies which are located in the atomsphere and over which there is continuously poured the waste water to be purified. What is disadvantageous with such installations is not only the fact that there is required a relatively large post-clarification basin in order to settle or quiet the biologically purified waste water to such an extent that the floating particles can settle, but there is continually present the danger that with hydraulic overloading of the installation such floating particles can be delivered to the outlet together with the purified waste water.

With the heretofore known total oxidation installation, the waste water, as a general rule, without any previous treatment in a pre-clarification stage, is introduced directly into an aeration vessel, generally after passage through a squeezing mill. The activated sludge in the aeration vessel ensures the biological decomposition of the sludge material, and the activated sludge receives the oxygen required for the decomposition process through intensive blowing-in of air into the basin or as a result of the circulation. The thus biologically purified waste water must be freed from the floating particles in a post-clarification stage. In this type of installation particular difficulties are present in overcoming the problem of the floating particles, since due to intensive aeration air bubbles collect at the floating particles which again, in the first instance, consist of activated sludge and therefore render difficult the settling process in the post-clarification stage. Hence, oftentimes there is arranged a degasification stage in front of the post-clarification stage. The danger of entraining floating particles, that is to say activated sludge, from the biological stage is essentially even further increased during sudden hydraulic loading of the total oxidation installation, so that with this type of installation there is present the considerable danger that the floating particles will arrive at the outlet for the clarified waste water or sewage.

The known activated sludge installations operate similar to the total oxidation installations, however require shorter aeration times. Additionally, in this case the prevailing waste water or sewage is not conducted through squeezing mills, rather, as a general rule, is pre-clarified in pre-clarification stages, then introduced into the biological stage. Such consists of a large basin in which the waste water is brought into contact with the activated sludge, and through intensive circulation of the basin contents and by blowing-in air is likewise aerated. Also in this case there are present the difficulties which were previously mentioned in conjunction with the total oxidation installations.

The activated sludge installation according to Swiss patent 485,605 strives to avoid the aforementioned drawbacks in that it contemplates that the biological stage is a receiving vessel or container sub-divided into at least two compartments by a filter formed of plastic or glass fibers. The waste water infeed opens into one compartment and the other compartment is connected with the outlet for the clarified waste water. With this known installation the settling basin, previously employed as the post-clarification stage, is replaced by a filter. However, in practice considerable difficulties arise during operation of the installation since the filter becomes easily clogged by the floating particles, so that there is lost the permeability of the filter needed for the functional reliability of the installation. The biologically purified waste water of the biological stage then arrives via the provided safety overflow together with the floating particles, especially the activated sludge, at the outlet. Such installations only can be employed with small sudden hydraulic loads.

SUMMARY OF THE INVENTION

Hence, it is a primary object of the present invention to provide a new and improved construction of installation for the mechanical-biological purification of waste water which effectively and reliably fulfills the need still existing in the art and is not associated with the aforementioned drawbacks and limitations of the prior art proposals.

Another and more specific object of the present invention relates to an improved construction of installation of the previously mentioned type for the mechanical-biological purification of waste water, wherein its functional reliability is ensured in each case and which reliably prevents the entrainment of floating particles into the outlet or discharge.

Now in order to implement these and still further objects of the invention, which will become more readily apparent as the description proceeds, the inventive installation is manifested by the features that the filter is a drum filter, wherein at its filter surface there engages at the infeed side thereof a suction nozzle which extends transversely with respect to the direction of relative movement between the filter surface and the suction nozzle.

Through the use of a drum filter having a suction device in the post-clarification stage of the mechanical-biological purification installation there is attained for the first time the notable advantage that the waste water purified in the biological stage arrives at the outlet or discharge free of floating particles or materials. The suction device ensures that the filter surface of the drum filter will not clog and the through-passage of the waste water will not be hindered. Even with the presence of large sudden hydraulic loads no floating particles can arrive at the outlet, since the waste water must continuously flow through the drum filter. Through automatic adjustment of an increased suction capacity or reduced switch-in duration of the suction devices, it is possible to handle in a very simple manner the larger amounts of floating particles which arise during sudden or peak loads. The suction action has proven to be so effective that even the smallest floating particles can be effectively removed from the filter surface of the drum filter. An interruption in the post-clarification treatment and therefore the entire purification installation for cleaning of the filter surface, as such has been found to be necessary with the abovementioned state-of-the-art purification installation taught in Swiss Pat. No. 485,605 is completely superfluous when utilizing the purification installation of the present development.

The present mechanical-biological purification installation can operate according to all known techniques for mechanical-biological purification. In so doing, in each case there can be dispensed with the previously known voluminous and therefore expensive settling basin of the post-clarification stage. Since with the novel post-clarification stage it is no longer necessary to work with calmed or settled water the corresponding receiving vessel or container can be dimensioned to be very small in size. Moreover, only in the case of large size installations is it necessary at most that the post-clarification stage be separate from the biological stage. It has been found to be particularly advantageous to arrange the post-clarification stage formed by the drum filter directly within the biological stage, that is to say, within the receiving vessel of the biological stage. This leads to a reduction in the constructional expenditure of the purification installation, something which is particularly advantageous in the case of small purification installations.

It is particularly advantageous to introduce the material sucked-off of the drum filter, and consisting of filter residues and sucked-back waste water, into the biological stage of the purification installation. It is of particular advantage if at the end of the suction conduit there is provided a device for spraying the sucked-off material, so that there is realized an additional aeration of the biological stage. This is particularly recommended in the case of small purification installations. With larger purification installations the sucked-off material can be introduced into a pre-clarification stage. However, it is also possible to deliver the sucked-off material to a separate preparatory device, for instance a composting installation. Hence, there can not only be delivered thereto the sucked-off material from the post-clarification stage but also that from the preclarification stage.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
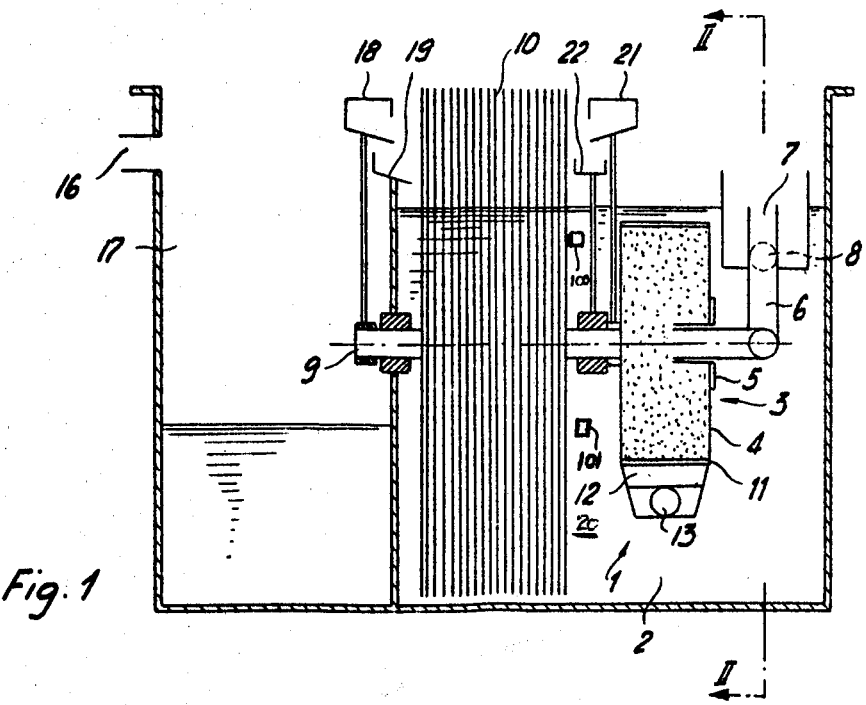
FIG. 1 schematically illustrates in longitudinal sectional view a small size purification installation incorporating a drum filter, taken substantially along the line I—I of FIG. 2.
Figure 2:
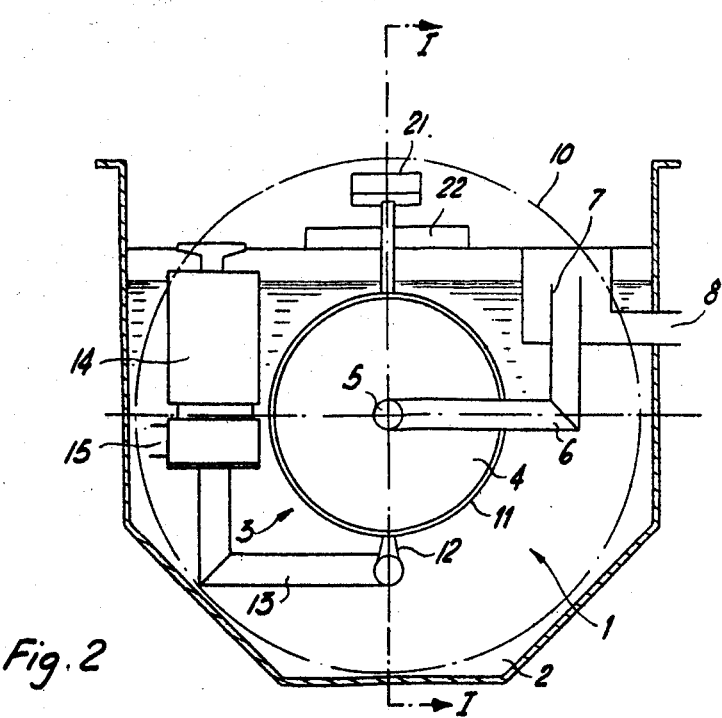
FIG. 2 illustrates the small size purification installation depicted in FIG. 1, taken substantially along the line II—II thereof.

Describing now the drawings, in FIGS. 1 and 2 there is illustrated a preferred constructional form of mechanical-biological small size purification installation, the biological stage 1 of which is arranged in a receiving vessel 2. Furthermore, this installation possesses a post-clarification stage 3 designed in the form of a drum filter 4. The drum filter 4 is completely closed and possesses a withdrawal line or conduit 6 which extends through a coaxial rotatable throughpassage guide 5, the withdrawal line 6 opening into an overflow 7 at which there is connected the withdrawal or outlet 8 for the purified waste water or sewage.

The completely enclosed drum filter 4 is detachably secured to the shaft 9 of an immersion drip body 10 of the biological stage 1. At the filter surface 11, which in the exemplary embodiment under consideration is defined by the peripheral surface of the drum filter 4, there engages from the outside, that is to say, from the infeed or wash-up side, a suction nozzle 12 which is coupled through the agency of a conduit 13 with a pump 14. The outfeed or withdrawal line 15 of the pump 14 opens into the receiving vessel 2 of the biological stage 1.

In the depicted mechanical-biological small size purification installation the waste water arrives through the agency of an infeed or delivery means 16 at an equalization vessel settling or container 17 where it can quiet or settle. A rotating scoop 18 is rigidly secured to the shaft 9 of the immersion drip body 10, and which also carries the drum filter 4. The equalization vessel 17 and the scoop 18 are designed such that they can take-up and compensate the fluctuations in the infeed of waste water which occur during normal operation. The quantity of waste water which arrives during a period of twenty-four hours is thus buffered at the equalization vessel 17 and delivered to the biological stage 1 in such a manner that the latter is uniformly loaded. The rotating scoop 18 delivers the scooped-up waste water to a trough 19, the outfeed of which opens into the receiving vessel or container 2 of the biological stage 1. The immersion drip body 10 can be designed in a number of different ways, but the helical or screw-shaped construction according to Swiss Patent 441,140 has been found to be particularly advantageous. The drive for the driven shaft 9 occurs through the agency of any suitable and therefore not particularly illustrated electric motor.

The waste water is conveyed by and during the rotation of the helically-shaped immersion drip body 10 and finally arrives at a widened compartment 20 following such immersion drip body. In this widened compartment 20 there is deposited, as a general rule, at most a small proportion of the floating materials or particles. The biologically purified waste water flows into the drum filter 4, and at least the major proportion of the floating particles deposit upon the filter surface 11. The biologically and mechanically purified waste water flows via the withdrawal 6 and the overflow 7 into the outlet 8.

With time so many floating particles deposit upon the filter surface 11 that its permeability begins to become impaired and a build-up or damming-up action occurs at the receiving vessel or container 2. If this damming-up action reaches a certain maximum value, it can actuate a float switch 100 which then places into operation the suction device. This exerts a suction action via its suction nozzle 12 across the filter surface 11 of the continuously rotating drum filter 4 until its permeability has again increased to such an extent that the damming-up action in the receiving vessel 2 recedes. If the liquid level in the receiving vessel again attains its normal state, then a second float switch 101 again switches-off the suction device. The material which has been sucked-off the filter surface is ejected by the suction device, through the agency of the outflow line 15, into the receiving vessel 2.

The floating particles or materials deposited in the receiving vessel 2, especially at the widened compartment 20, are taken-up by a scoop arrangement 21 secured to the shaft 9 and delivered to a withdrawal trough 22. From that location the floating particles can flow off into a non-illustrated preclarification vessel.

The mechanical-biological small purification installation depicted in FIGS. 1 and 2 is particularly suitable for use in an environment encompassing up to 600 residents, that is to say, it can handle a quantity of waste water which would be present in a residential community with total occupancy of 600 persons. In an installation designed equivalent to six residents the helical-shaped immersion drip body 10, with a diameter of 1,000 mm would have 27 coils or threads with a pitch of 25 mm. The rotational speed of the immersion drip body is in the order of 3 to 5 revolutions per minute, so that the drum filter would also carry out 3 to 5 revolutions per minute, and therefore, the entire filter surface would move 3 to 5 times per minute past the suction nozzle 12.

As already previously mentioned, the filter surface 11 of the drum filter 4 is periodically subjected to the suction action of the suction device. This is quite important since extensive trials have shown that the micro-organisms not only tend to settle upon, but also in the material of the filter, grow there and cannot be removed therefrom by pure flushing to such a degree that the function of the filter material will be positively maintained. Due to the suction action the filter material is also freed from fine and extremely fine floating material particles, especially activated sludge particles, so that slow clogging and therefore gradual inoperativeness of the drum filter can be prevented.

Figure 3:
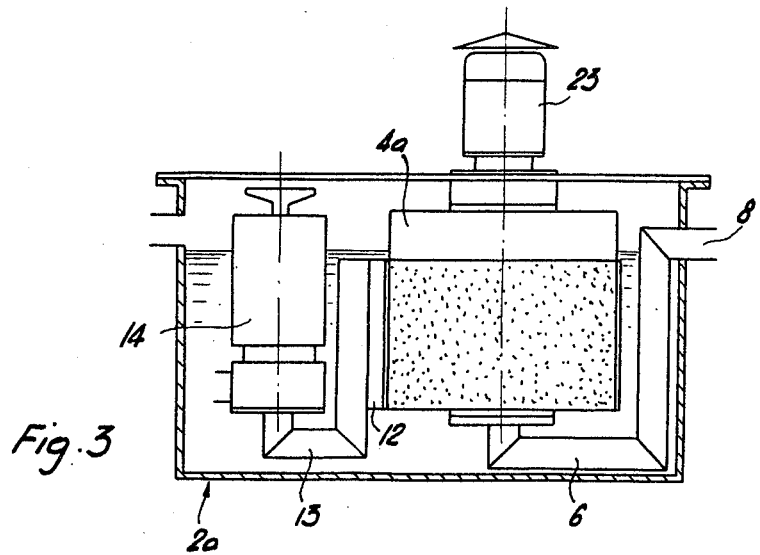
FIG. 3 illustrates a clarification stage with vertically arranged drum filter and in longitudinal sectional view.

FIG. 3 illustrates a further filter device which can be employed in conjunction with a pre-clarification stage and/or post-clarification stage. The filter device will be seen to embody a vertically arranged drum filter 4a, the upper surface of which will be recognized to extend past the liquid level in the receiving vessel or container 2a and which advantageously is open at the top. Withdrawal of the purified waste water or sewage occurs, analogous to the exemplary embodiment of FIGS. 1 and 2, coaxially with respect to the axis of the drum filter 4a. As the drive 23 for the drum filter 4a there can be advantageously employed an electric motor located above the drum filter.

Figure 4:
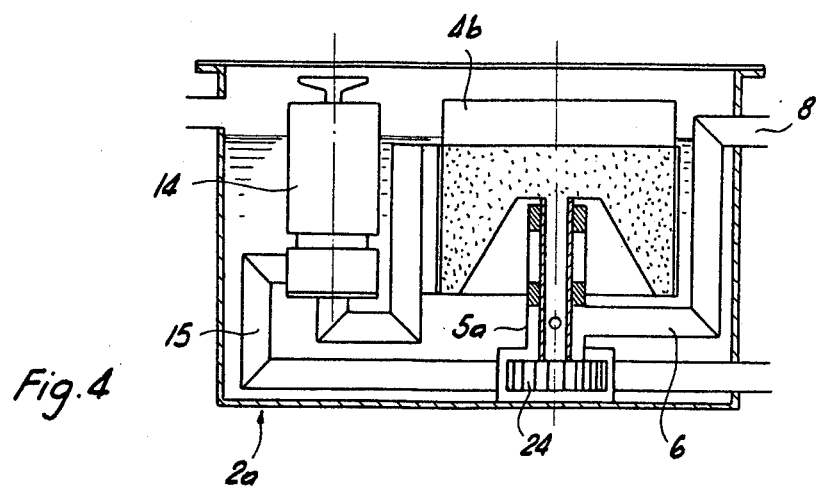
FIG. 4 illustrates a further clarification stage with vertically arranged drum filter, also in longitudinal sectional view, and also showing a turbine drive supplied by the suction device.

FIG. 4 illustrates a further filter device which can be employed in a pre-clarification stage and/or post-clarification stage, and which is designed analogous to the filter device of FIG. 3, however employs as the drive a turbine 24 supplied by the outlet 15 of the suction device. Due to this construction there is overcome the need for an additional drive motor for the drum filter and there is provided a direct coupling between the suction and rotation of the drum filter 4b of the filter device. The filtration operation itself occurs, just as in the case of the embodiment of FIG. 3, without rotating the drum filter 4b, so that its bearings and particularly the rotary throughpassage guide 5a of the outlet 6 and the filter material web are advantageously protected.

Figure 5:
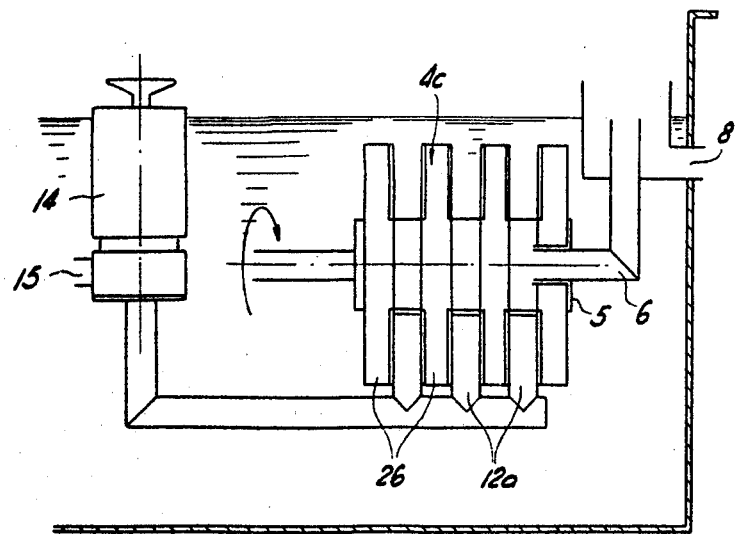
FIG. 5 illustrates in longitudinal sectional view a further clarification stage with a horizontally arranged rotating drum filter and possessing disk-like compartments.

FIG. 5 illustrates a further filter device employed in a pre-clarification stage and/or post-clarification stage, wherein the drum filter 4c of such filter device will be seen to be equipped with disk-like compartments 26. The end surfaces of neighboring compartments 26 are wiped by suction nozzles 12a of the suction device. With this construction it is possible to accommodate, in contrast to the previously described drum filters, a much larger area of active filter surface in a limited space.

Figure 6:
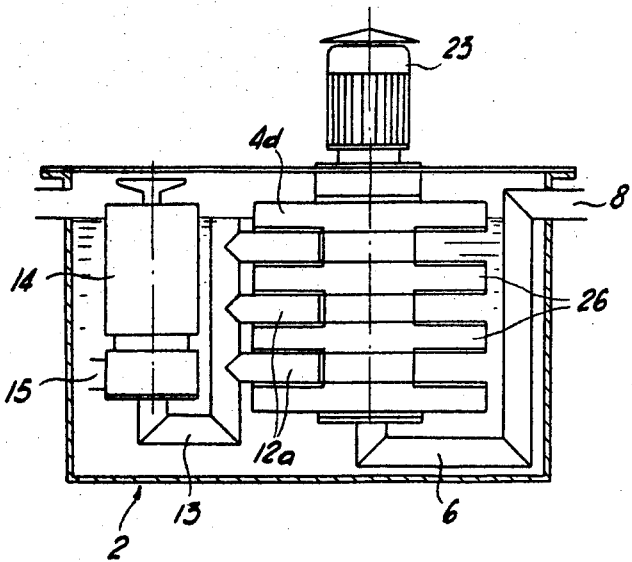
FIG. 6 is a longitudinal sectional view of a further clarification stage, analogous to the showing of FIG. 5, however showing a vertically arranged drum filter.

While in the arrangement of FIG. 5 the drum filter is horizontally diposed in the arrangement of FIG. 6 the analogously constructed drum filter 4d is vertically arranged and will be seen to be equipped with its own drive 23, whereas the drum filter of FIG. 5, analogous to the exemplary embodiment of FIGS. 1 and 2, can be directly connected to an immersion drip body.

Figure 7:
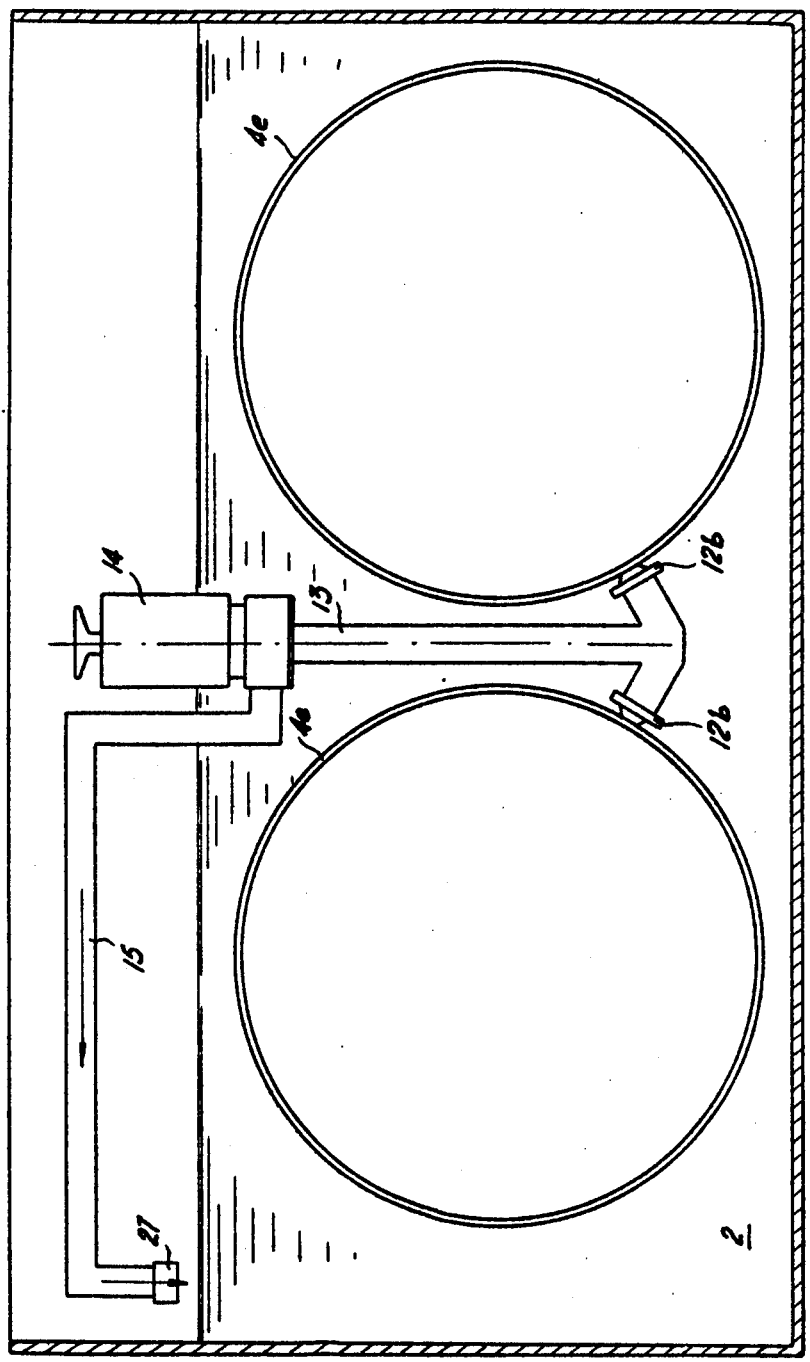
FIG. 7 is a further clarification stage with two drum filters and a common suction device, shown schematically and in end view.

The filter device depicted in FIG. 7 will be seen to embody two parallelly arranged drum filters 4e, and there is operatively associated therewith a common suction device. This common suction device will be seen to embody two suction nozzles 12b which are connected via a common conduit 13 with a pump 14. The outlet or discharge 15 carries at its depicted end a spray mechanism 27 which opens above the liquid level in the receiving vessel 2 and which sprays the material sucked-off the drum filter 4e into the waste water in the receiving vessel 2. In the illustrated example the drum filters 4e are directly arranged as post-clarification stages in the receiving vessel 2 of the biological stage, so that due to the spraying-in of the material sucked-off the drum filters 4e into the waste water there occurs an additional aeration of the biological stage. In the event that the post-clarification or post-purification stage containing the drum filter is arranged separately with regard to the biological stage, then for the purpose of the additional aeration of the biological stage the withdrawal or outlet line 15 of the pump 14 must be guided into the biological stage.

For the cleaning of waste water or sewage particularly advantageous constructional embodiments of filter devices will be described hereinafter: as can be seen from FIGS. 8 to 12 and 14 the drum filter possesses a perforated jacket or outer surface 28 over which there is spanned a filter material web 29a (FIG. 8), 29b (FIG. 9), 29c (FIG. 10), 29d (FIG. 11), 29 (FIG. 12) which is resistant to rotting or decaying. In so doing, the filter material web can be spanned upon the jacket or outer surface by means of a helically- or screw-shaped extending wire 30 formed of corrosion resistant steel or plastic, as best seen by referring to FIG. 12. It is particularly advantageous to cover the filter material web at the wash-up or alluvial side with a thin protective grid 31 in order to reduce the wear of the filter material and further to improve the suction efficiency. The thickness of the protective grid 31 as well as the size of its holes 32 and the contact with the filter material 29 are corrolated to one another in such a way that no leakage losses are present for the suction nozzle and the filter material web possesses such a degree of freedom of movement that the filter material web during the suction action can be domed towards the suction nozzle. The protective grid 31 advantageously consists of a perforated sheet metal plate of 0.5 to 1.5 millimeters thickness and formed of corrosion resistant steel. Punched into the latter are advantageously square openings of an edge length of 15 to 20 millimeters with a web width of 2 to 3 millimeters.

The filter material web can be, for instance, 3 to 20 millimeters thick. Suitable materials are advantageously rotting resistant plastics, such as polyester or polypropylene as well as glass fibers.

Figure 8:
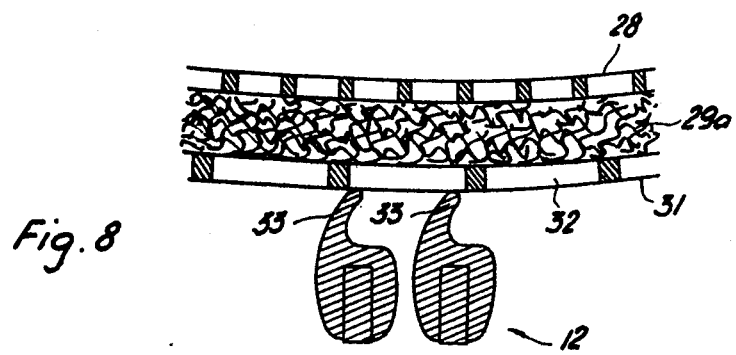
FIG. 8 is a cross-fragmentary and sectional view of the jacket or outer surface of a drum filter equipped with a needle felt and protective grid.

FIG. 8 illustrates a section of the drum filter wherein a filter material web 29a formed of polypropylene felt is placed over the perforated jacket or outer surface 28. This felt can have a thickness of 3 to 12 millimeters. The filter material web 29a is covered in the direction of the alluvial or infeed side by the protective grid 31. The lips 33 of a suction nozzle 12 engage thereat. Instead of having the protective grid 31 cover the polypropylene mat or felt 29a as depicted in FIG. 8, the protective grid can also be dispensed with and instead of such the polypropylene felt or mat can be stitched with a polyester thread in axial as well as peripheral direction of the filter drum. The spacing of the stitch seams amounts to preferably 15 millimeters.

Figure 9:
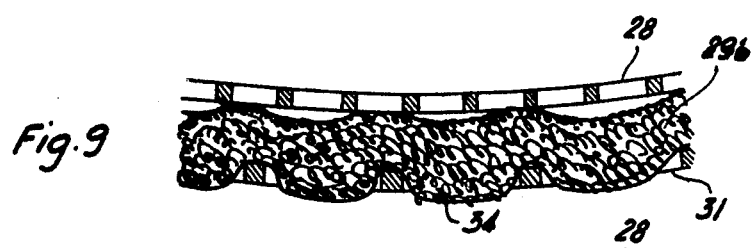
FIG. 9 illustrates in cross-section and fragmentary view the jacket or outer surface of a drum filter covered with a foamed plastic and protective grid.

FIG. 9 likewise illustrates a section of a drum filter in which a foamed plastic web 29b constituting the filter material web is placed upon the perforated jacket or outer surface 28, and which as in the case of the embodiment of FIG. 8, is covered by a protective grid 31. In this Figure there is indicated that the filter material web 29b possesses domed portions 34 which are formed by subjecting the filter material web which is protected by the protective grid 31 to a suction action. The foamed plastic web 29b provides good results concerning quality of the waste water, danger against clogging and mechanical resistance.

Figure 10:
FIG. 10 illustrates in cross-section and fragmentary view the jacket or outer surface of a drum filter covered with a needle felt and bristles.

FIG. 10 illustrates a further particularly advantageous constructional embodiment of drum filter in which there is arranged as the filter material web a needle felt web 29c which is strengthened by impregnation and which contains bristles 35 protruding towards the infeed or inflow side. The needle felt web 29c possesses, for instance, a thickness of 8 to 16 millimeters, wherein the bristles, for instance, can have a length of 3 to 5 millimeters. The bristles 35 function in the form of a collecting grid for coarse floating particles. Moreover, a prefilter 36 formed of floating material, for instance sludge, can form at the needle felt web, and which is very pervious to water and during clogging can form a natural seal between the needle felt web and the suction nozzle against any possible leakage currents or streams due to the bristles which move past the suction nozzle.

Figure 11:
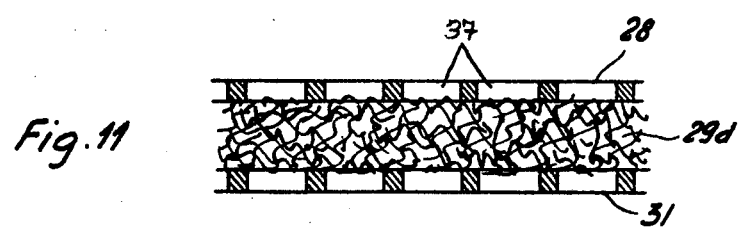
FIG. 11 illustrates in cross-section and fragmentary view the jacket or outer surface of a drum filter covered with a glass fiber mat and protective grid.
Figure 12:
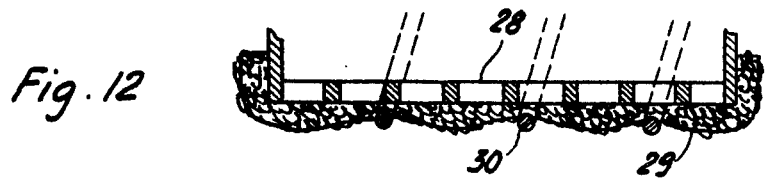
FIG. 12 illustrates in longitudinal sectional view and in fragmentary view the attachment of a filter material web to the jacket or outer surface of a drum filter.

FIG. 11 illustrates a section of a drum filter in which a glass fiber mat 29d serving as the filter material web is arranged upon the perforated jacket or outer surface 28 and which is again covered towards the inflow side by the protective grid 31. The glass fiber mat 29d advantageously possesses a thickness of 3 to 5 millimeters. The holes 37 and 31 of the perforated jacket 28 and protective grid 31 respectively preferably have an inner opening of 5 millimeters.

As already mentioned the filter material web 29 can be secured by means of a wire 30 upon the perforated jacket or outer surface 28 of the drum filter. In such case it is possible to dispense with a protective grid, as will be seen by referring to FIG. 12. In order to render possible the free mobility of the filter material web and to simultaneously attain a greater mechanical resistance, it is advantageous to provide the wire coils at a spacing of 15 to 25 millimeters. In so doing, the wire can be wound in individual rings or helically over the filter material web. In such case it is not necessary that the suction nozzle additionally have sealing lips of the type depicted in FIG. 8, rather it is satisfactory to arrange the suction opening closely for contact at the filter material web 29. During the suction action the leakage losses occurring at the region of the wire guide are negligibly small.

It is advantageous if filter material webs consisting of threads and/or fibers, especially felts, are strengthened with an impregnation agent or adhesive. Such filter material webs are preferably immersed in the impregnation- or adhesive agent, and thereafter such agent is again squeezed out to such an extent that the original hollow voids for the most part, for instance up to 80 percent, are again produced. The impregnation- or adhesive agent remaining in the filter material web encloses the cross-over locations of the fibers or threads and joins such with one another. Due to this treatment the resistance of the filter material against wear by the suction nozzle is increased, whereby also the pliability, water permeability and filter efficiency is maintained.

Figure 13:
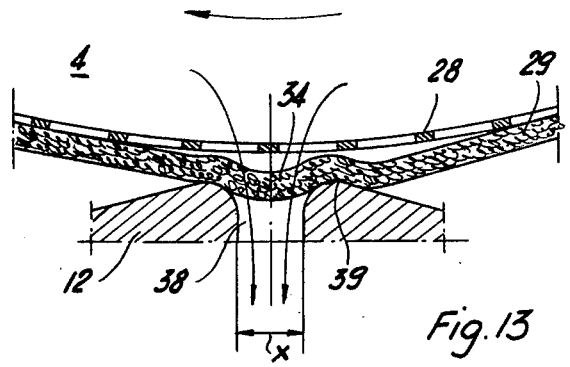
FIG. 13 illustrates in cross-section and in fragmentary view the point of attack or engagement of a suction nozzle at a filter material web.

FIG. 13 illustrates a particularly advantageous mode of operation of the suction nozzle 12 at the filter material web 29 which bears upon the perforated jacket 28.

As already mentioned the selection and arrangement of the filter material web is to be undertaken such that during the suction action it is subjected to doming or arching, as indicated by reference character 34 in the nozzle opening 38 of the suction nozzle 12. Due to this change in shape of the filter material web brought about by the suction action the position, form and course of the filter channels of the filter material web are changed during the suction action, so that the filtered-in floating particles are released and due to the wash back or flushing action by the already purified waste water floated out of the filter material web.

In order to realize this change in shape of the filter material web during the suction action, the properties of the filter material web, the peripheral speed of the drum filter, the construction of the suction nozzle and the pump capacity advantageously are to be accommodated to one another and to the waste water. The gap width X of the nozzle opening 38 should advantageously not fall below a lower gap width. Thus, for instance, it is advantageous to select the gap width X equal to twice the thickness of the filter material web. The nozzle edge 39 should bear as closely as possible at the filter material web 29, so that there can be prevented leakage currents or flow during the suction action. In order to realize good sealing of the nozzle opening at the filter material and moreover to maintain as small as possible the wear of the filter material web it is advantageous to allow the nozzle edges 39 at the sides facing away from the nozzle opening 38 to extend at least approximately tangentially with respect to the filter surface. Furthermore, it is advantageous to configure the nozzle edges as smooth as possible. It is advantageous if at least the nozzle edges are formed of polished chromium steel or a wear resistant plastic, such as NYLON. They can also be coated with TEFLON in order to improve the sliding properties.

Figure 14:
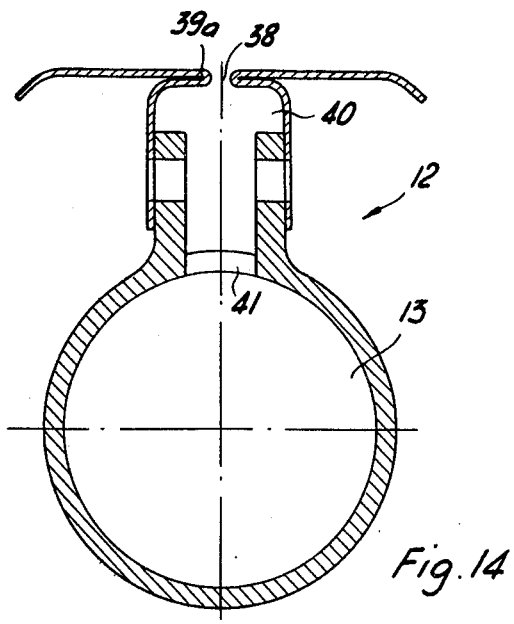
FIG. 14 illustrates in cross-sectional view a further embodiment of suction nozzle.

FIG. 14 illustrates a particularly advantageous constructional embodiment of suction nozzle, the nozzle opening 38 of which is formed by rounded nozzle edges 39a which extend at the side facing away from the nozzle opening 38 practically perpendicular to the central axis of the nozzle, so that at the region of attack of the nozzle at the drum filter they extend practically tangentially with respect thereto. The nozzle opening 38 opens into a widened nozzle compartment or chamber 40 which is in flow communication via an opening 41 with the conduit 13 leading to the pump.

The constructional embodiments depicted in FIGS. 13 and 14 of suction nozzle are particularly suitable for the direct application thereof at a filter material web. At that location where the filter material web is covered with a protective grid it is recommended to provide sealing lips 33 at the nozzle edges, as such has been shown in FIG. 8.

Figure 15:
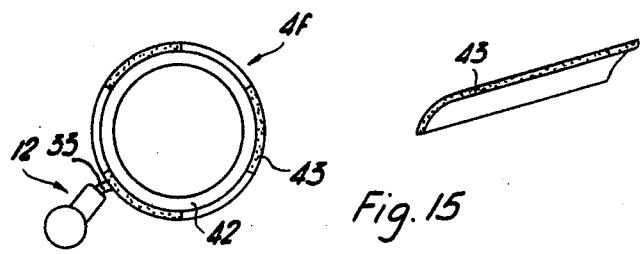
FIG. 15 illustrates a drum filter incorporating a filter plate mounted upon a support frame.

In certain instances it can be advantageous to design the drum filter according to FIG. 15, instead of using the filter material web. This drum filter 4f possesses a support frame 42 at which there are applied porous filter plates 43 formed of ceramic or sintered plastic and forming the filter surface. At the filter surface there engages the suction nozzle 12, the nozzle edge of which, similar to the constructional embodiment of FIG. 8, is equipped with sealing lips 33. In order to fabricate such drum filter the filter plates are sintered to the required size and inserted into the support frame. Clogged or defective filter plates can be very easily replaced. The cleaning efficiency of this drum filter is extremely good.

While there is shown and described present preferred embodiments of the invention, it is to be distinctly understood that the invention is not limited thereto, but may be otherwise variously embodied and practiced within the scope of the following claims. Accordingly,

What is claimed is:

1. An installation for the mechanical-biological purification of waste water, comprising means for the biological purification of said waste water and means for the mechanical purification of said waste water, said mechanical purification means including a drivable drum filter having a filter surface including an inflow side, cleaning means for cleaning the filter surface, said cleaning means for the drum filter comprising a suction device including a suction nozzle, said suction nozzle being immersed in the waste water and snugly bearing against the inflow side of the filter surface of the drum filter, and a drive turbine provided for the drum filter, said suction device having a withdrawal line, the withdrawal line of the suction device supplying said drive turbine.

2. An installation for the mechanical-biological purification of waste water, comprising means for the biological purification of said waste water and means for the mechanical purification of said waste water, said mechanical purification means including a drivable drum filter having a filter surface defined by a filter material web and including an inflow side, cleaning means for cleaning the filter surface, said cleaning means for the drum filter comprising a suction device having a suction nozzle, said suction nozzle being immersed in the waste water and snugly bearing against the inflow side of the filter surface, said suction nozzle having a nozzle opening the gap width of which is dimensioned such that during application of negative pressure at the suction nozzle the filter web material is partially domed at the contacted portion thereof and is partially drawn into the nozzle opening whereby leakage losses across the nozzle opening are substantially eliminated, said biological purification means further including a rotating immersion drip body having a drive shaft, said drum filter being connected with the drive shaft of the rotating immersion drip body and driven thereby.

3. An installation for the mechanical-biological purification of waste water incorporating at least one biological stage and one post-clarification stage, said post-clarification stage possessing a filter, the improvement comprising said filter being a drum filter having a filter surface including an inflow side, a suction nozzle operatively associated with the inflow side of the filter surface of the drum filter, said suction nozzle extending transversely with respect to the direction of relative movement between filter surface and suction nozzle, a rotating immersion drip body provided for the biological stage, said drum filter of the post-clarification stage being connected with the rotating immersion drip body and driven thereby.

4. An installation for the mechanical-biological purification of waste water incorporating at least one biological stage and one post-clarification stage, said post-clarification stage possessing a filter, the improvement comprising said filter being a drum filter having a filter surface including an inflow side, a suction device incorporating a suction nozzle provided for the drum filter of the post-clarification stage, said suction nozzle being operatively associated with the inflow side of the filter surface of the drum filter, said suction nozzle extending transversely with respect to the direction of relative movement between filter surface and suction nozzle, said suction device having a withdrawal line opening into the biological stage, a drive turbine provided for the drum filter, the withdrawal line of the suction device supplying said drive turbine.

5. An installation for the mechanical-biological purification of waste water, comprising means for the biological purification of said waste water and means for the mechanical purification of said waste water, said mechanical purification means including a drivable drum filter having a filter surface defined by a filter material web and including an inflow side, cleaning means for cleaning the filter surface, said cleaning means for the drum filter comprising a suction device having a suction nozzle, said suction nozzle being immersed in the waste water and snugly bearing against the inflow side of the filter surface, said suction nozzle having a nozzle opening the gap width of which is dimensioned such that during application of negative pressure at the suction nozzle the filter web material is partially domed at the contacted portion thereof and is partially drawn into the nozzle opening whereby leakage losses across the nozzle opening are substantially eliminated.

6. The installation as defined in claim 5, wherein said suction device has a withdrawal line opening into said biological purification means, and means provided at the end of the withdrawal line for spraying the material sucked-off the drum filter.

7. The installation as defined in claim 5, wherein said suction device has a withdrawal line, and the withdrawal line of the suction device opens into a pre-clarification stage.

8. The installation as defined in claim 5, wherein the drum filter incorporates means providing disk-like compartments, and suction nozzles engaging at the end surfaces thereof.

9. The installation as defined in claim 5, wherein the axis of rotation of the drum filter is substantially vertically arranged.

10. The installation as defined in claim 9, wherein the drum filter is open at the top.

11. The installation as defined in claim 5, wherein said drum filter incorporates a perforated jacket, and a rotting resistant-filter material web spanned over the perforated jacket.

12. The installation as defined in claim 11, further including a protective grid for covering the filter material web.

13. The installation as defined in claim 11, further including wire coils for securing the filter material web.

14. The installation as defined in claim 11, wherein the filter material web possesses substantially radially protruding bristles.

15. The installation as defined in claim 11, wherein the filter material web is formed of foamed plastic.

16. The installation as defined in claim 11, wherein the filter material web is a material web formed of fibers wherein at least a portion of the neighboring fibers are connected with one another by a connecting agent.

17. The installation as defined in claim 16, wherein the connecting agent is an impregnation agent.

18. The installation as defined in claim 16, wherein the connecting agent is an adhesive agent.

19. The installation as defined in claim 11, wherein the filter material web possesses a thickness in the range of 3 to 20 millimeters.

20. The installation as defined in claim 19, wherein the filter material web is a needle felt.

21. The installation as defined in claim 19, wherein the filter material web is a glass fiber mat.

22. The installation as defined in claim 5, further including a support frame for the drum filter, and porous filter plates for forming the filter surface mounted at the support frame.

23. The installation as defined in claim 22, wherein the porous filter plates are formed of ceramic.

24. The installation as defined in claim 22, wherein the porous filter plates are formed of sintered plastic.

25. The installation as defined in claim 5, wherein the edges of the nozzle viewed in the relative direction of movement between the suction nozzle and the filter surface at the sides facing away from the nozzle opening extend at least approximately tangentially and parallel to the filter surface and are rounded at the inside of the suction nozzle opening.

26. The installation as defined in claim 5, further including a receiving vessel containing the drum filter, said receiving vessel containing two switches which respond to the degree of filling of the receiving vessel, of which one switches in the suction device when a maximum degree of filling has been reached and the other switches-off the suction device when a minimum degree of filling has been reached.

* * * * *